(12) United States Patent
Nakano et al.

(10) Patent No.: US 8,409,005 B2
(45) Date of Patent: Apr. 2, 2013

(54) INPUT DEVICE AND GAME SYSTEM INCLUDING THE INPUT DEVICE

(75) Inventors: Hideyasu Nakano, Tokyo (JP); Toyokazu Sakai, Tokyo (JP); Yasushi Mito, Tokyo (JP); Hidekazu Shimizu, Tokyo (JP); Hyogo Takahashi, Tokyo (JP); Miho Ikeuchi, Tokyo (JP); Tomohiro Inami, Tokyo (JP); Nayuta Aoshima, Tokyo (JP); Masayuki Shamoto, Tokyo (JP); Takehiro Iikawa, Tokyo (JP); Shigeharu Saeki, Tokyo (JP); Ryo Horie, Tokyo (JP); Naoko Nasuhara, Tokyo (JP); Hiroshi Hayasaka, Tokyo (JP); Takuya Aono, Tokyo (JP); Hiroyuki Takada, Tokyo (JP); Kazunori Yokoyama, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 13/388,933

(22) PCT Filed: Aug. 2, 2010

(86) PCT No.: PCT/JP2010/063036
§ 371 (c)(1),
(2), (4) Date: Feb. 3, 2012

(87) PCT Pub. No.: WO2011/016426
PCT Pub. Date: Feb. 10, 2011

(65) Prior Publication Data
US 2012/0135806 A1    May 31, 2012

(30) Foreign Application Priority Data
Aug. 6, 2009 (JP) .................. 2009-183925

(51) Int. Cl.
*A63F 9/24* (2006.01)
*A63F 13/00* (2006.01)
(52) U.S. Cl. ............................................ 463/37; 463/36
(58) Field of Classification Search .............. 463/36–39, 463/46, 47
See application file for complete search history.

(56) References Cited

U.S. PATENT DOCUMENTS

| 6,225,547 B1 | 5/2001 | Toyama et al. |
| 6,312,335 B1 | 11/2001 | Tosaki et al. |
| 6,347,998 B1 | 2/2002 | Yoshitomi et al. |

(Continued)

FOREIGN PATENT DOCUMENTS

| JP | 10-214155 A | 8/1998 |
| JP | 2001-009152 A | 1/2001 |

(Continued)

OTHER PUBLICATIONS

International Search Report mailed Sep. 14, 2010.

*Primary Examiner* — Milap Shah
(74) *Attorney, Agent, or Firm* — Howard & Howard Attorneys PLLC

(57) ABSTRACT

An input device is provided which can input operations corresponding to play techniques used in stringed instruments. A guitar controller (10), which comprises a body part (31), a neck part (32) extending from the body part (31) and a head part (33) provided at the front end of the neck part (32), has, in the head part (33), a triaxial acceleration sensor (40) that can detect accelerations.

14 Claims, 11 Drawing Sheets

U.S. PATENT DOCUMENTS

| | | | |
|---|---|---|---|
| 6,390,923 B1* | 5/2002 | Yoshitomi et al. | 463/43 |
| 7,973,234 B1* | 7/2011 | Yang et al. | 84/743 |
| 2007/0052177 A1 | 3/2007 | Ikeda et al. | |
| 2008/0153593 A1 | 6/2008 | Ikeda et al. | |
| 2009/0042650 A1* | 2/2009 | Chiwata | 463/37 |
| 2009/0104997 A1* | 4/2009 | Ishida et al. | 463/43 |
| 2009/0156306 A1* | 6/2009 | Guinchard et al. | 463/37 |
| 2009/0258700 A1* | 10/2009 | Bright et al. | 463/31 |
| 2010/0009749 A1* | 1/2010 | Chrzanowski et al. | 463/35 |
| 2011/0028214 A1* | 2/2011 | Bright et al. | 463/35 |
| 2011/0086704 A1* | 4/2011 | Davis et al. | 463/31 |
| 2012/0129604 A1* | 5/2012 | Hayasaka et al. | 463/37 |

FOREIGN PATENT DOCUMENTS

| | | |
|---|---|---|
| JP | 2001-096061 A | 4/2001 |
| JP | 2005-046422 A | 2/2005 |
| JP | 2007-054114 A | 3/2007 |

* cited by examiner

INPUT DEVICE AND GAME SYSTEM INCLUDING THE INPUT DEVICE

CROSS REFERENCE TO RELATED APPLICATION

This application is a national stage application of PCT/JP2010/063036, filed Aug. 2, 2010, which claims priority to Japanese Patent Application No. 2009-183925, filed Aug. 6, 2009, the disclosures of which are hereby incorporated by reference in their entirety.

TECHNICAL FIELD

The present invention relates to an input device used for a game system or the like and a game system including the input device.

BACKGROUND ART

There is a known input device used for a music game and imitating a guitar (see Patent Literature 1, for example). Patent Literature 1: Japanese Patent Application Laid-Open No. 2001-96061.

SUMMARY OF INVENTION

Technical Problem

The imitation guitar input device for the music game as described in the Patent Literature 1 is operated similarly to an actual guitar. Therefore, various guitar playing techniques may be used at the imitation guitar input device. These playing techniques include techniques for moving the imitation guitar input device. However, the imitation guitar input device in the Patent Literature 1 cannot input the motion carried out by a player. Therefore, in a game system having such an input device, the motion by the player cannot be sufficiently reflected in the game.

Therefore, an object of the present invention is to provide an input device that can input a motion corresponding to a playing technique used at a stringed instrument and a game system including the input device.

Solution to Problem

An input device according to the present invention imitates a stringed instrument, and comprises: a body portion; a neck portion extending from the body portion; a head portion provided to a leading end of the neck portion; and wherein, the head portion is provided with an acceleration detecting device that can detect acceleration.

According to the present invention, since the acceleration detecting device provided to the head portion can detect a motion, it is possible to detect and input the motion corresponding to a playing technique used at the input device imitating the stringed instrument. Various playing techniques are used at the stringed instrument and most of them are moving the head portion more greatly than the body portion. In this case, since the acceleration detecting device is provided to the head portion which is likely to be moved more greatly than the body portion, it is possible to detect the motion of the input device with a higher sensitivity. As a result, it is possible to more accurately grasp the motion of the input device.

The input device may imitate any instrument as the stringed instrument. For example, in an aspect of the input device according to the present invention, the input device may imitate a guitar as the stringed instrument.

In an aspect of the input device according to the present invention, a triaxial acceleration detecting device that can detect the acceleration in directions of three axes orthogonal to each other including an extending direction of the neck portion may be used as the acceleration detecting device. In this case, since motions in the directions of the three axes orthogonal to each other including the extending direction of the neck portion can be detected, it is possible to input the motions corresponding to more various playing techniques.

A game system according to the present invention comprises: the input device according to any one of claims 1 to 3 provided with at least one operation portion; a display device that outputs and displays a game screen; an audio output device that outputs and plays back game sounds; a music composition data storage device that stores music composition data for playing back music; a music playback device that plays back the music from the audio output device based on the music composition data; a sequence data storage device that stores sequence data describing operation moments of the operation portion during the game; and an operation guiding device that guides a operation of the operation portion to a player by determining the operation moments of the operation portion included in a predetermined time period from a current time toward future in the music based on the sequence data, displaying an operation instruction sign corresponding to each determined operation moment and an operation reference sign corresponding to the current time arranged in a layout along a time axis on the game screen, and producing a relative displacement between the operation reference sign and the operation instruction sign according to progress of time in the music so that a location of the operation instruction sign coincides with a location of the operation reference sign at the operation moments to be indicated by the operation instruction sign, and wherein the operation guiding device includes a motion guiding device that guides a predetermined motion to the player by displaying a motion instruction sign corresponding to an motion moment at which the player should carry out the predetermined motion for the input device displayed in a layout along the time axis on the game screen, and producing a relative displacement between the motion instruction sign and the operation reference sign according to the progress of time in the piece of music so that a location of the motion instruction sign coincides with a location of the operation reference sign at the motion moment to be indicated by the motion instruction sign.

According to the game system of the present invention, since it is possible to guide the instruction of the motion according to the playback music to the player, it is possible to request the playing technique according to the music to the player. In this way, it is possible to improve sense of realism of the player. Also, since the game system includes the above-described input device, the motion of the input device by the player can be reflected in a game situation.

The predetermined motion for which the motion guiding device guides may include any operation. For example, in an aspect of the game system according to the present invention, the predetermined motion may include a motion in a direction which is parallel to an upper face of the body portion and orthogonal to the extending direction of the neck portion. For example, in an aspect of the game system according to the present invention, the predetermined motion may include a motion in a direction which is orthogonal to an upper face of the body portion and orthogonal to the extending direction of the neck portion. For example, in an aspect of the game system according to the present invention, the predetermined motion may include a motion of the head portion from a position beside the player to a position in front of the player. For example, in an aspect of the game system according to the present invention, the predetermined motion includes a motion for moving the neck portion from such a position that the neck portion extends toward a side of the player into such a position that the neck portion extends upward in a vertical direction.

In an aspect of the game system according to the present invention, the game system may further comprise a determining device that determines the predetermined motion based on a detection result of the acceleration detecting device provided to the input device. In this case, since the predetermined motion can be determined, it is possible to evaluate the predetermined motion carried out by the player following the instruction.

Advantageous Effects of Invention

As described above, according to the input device of the present invention, it is possible to input the motion corresponding to the playing technique used at the stringed instrument.

DESCRIPTION OF EMBODIMENTS

Figure 1:
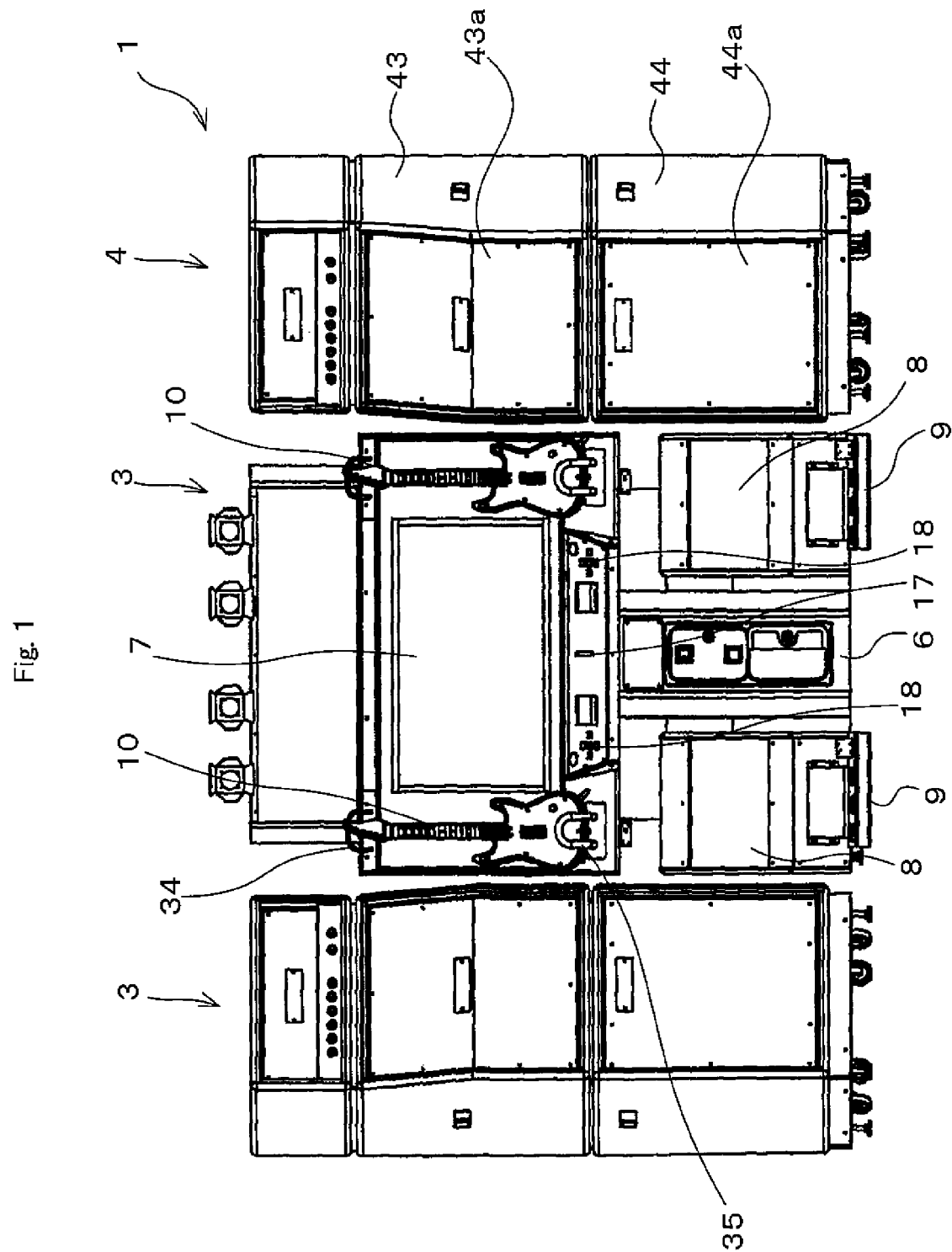
FIG. 1 is a front view of a game device to which an input device according to an embodiment of the invention is applied.
Figure 2:
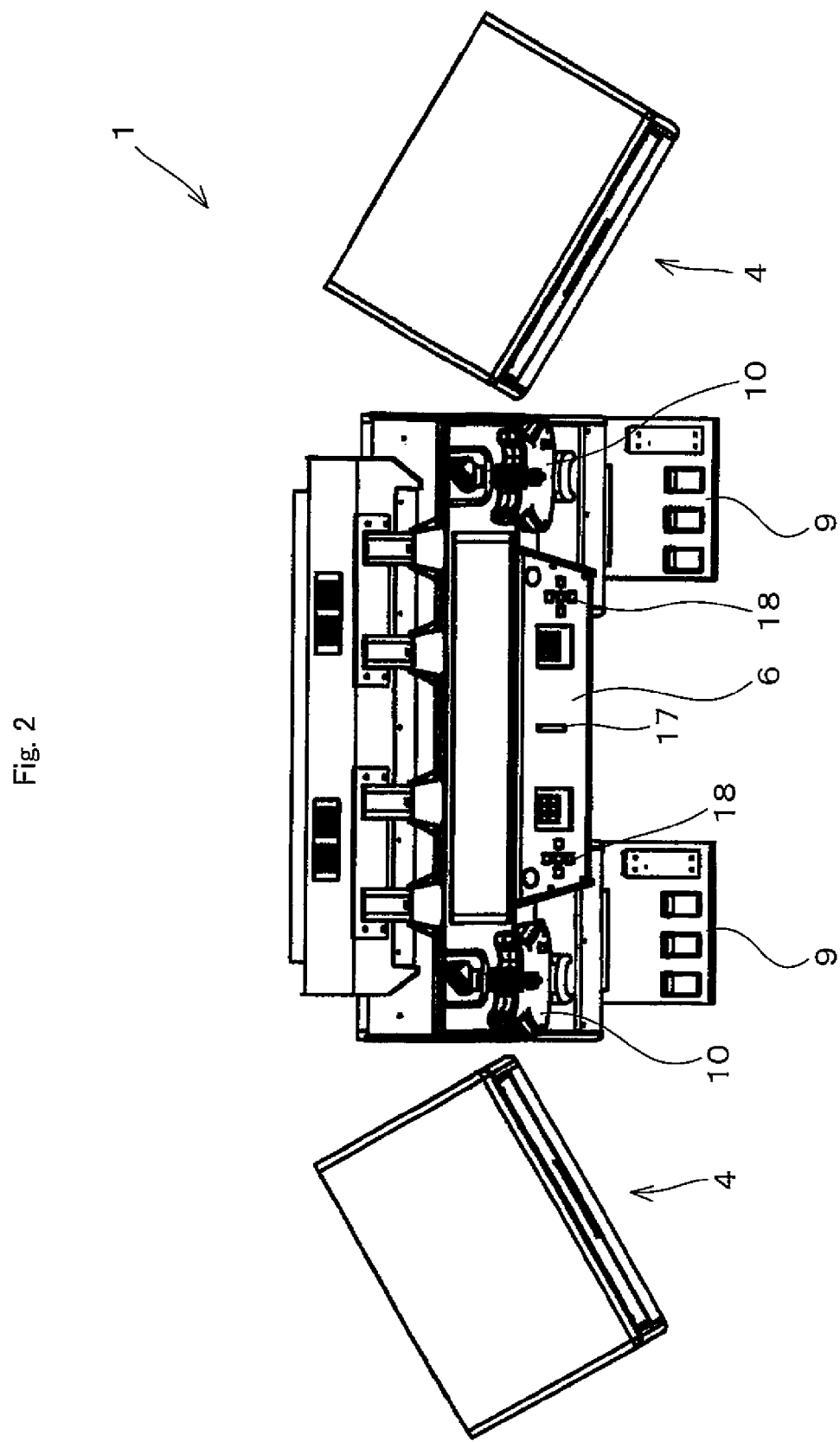
FIG. 2 is a plan view of the game device to which the input device of the embodiment is applied.

A game device to which an input device according to an embodiment of the invention is applied will be described below. FIG. 1 is a front view of the game device, and FIG. 2 is a plan view of the game device. The game device is configured as an arcade music game device installed in a commercial facility. As illustrated in FIGS. 1 and 2, a game device 1 includes a main unit 3 and two large-size speakers 4 that imitate amplifiers. The main unit 3 includes a chassis 6, a monitor 7 that is disposed in a upper front surface of the chassis 6, two small-size speakers 8 that are disposed below the monitor 7 and on the left and right of the chassis 6, a foot pedals 9 that are disposed in front of the small-size speakers 8, and two guitar controllers 10 that are disposed on the left and the right of the monitor 7. Each of the two guitar controllers 10 functions as the input device of the invention.

In the chassis 6, there are provided a coin insertion slot 17 and plural push buttons 18 that are used for progression of the game. In addition, a card reader may be provided in the chassis 6. Therefore, the same effect as the insertion of the coin in the coin insertion slot 17 can be generated by reading data of the card.

Figure 3:
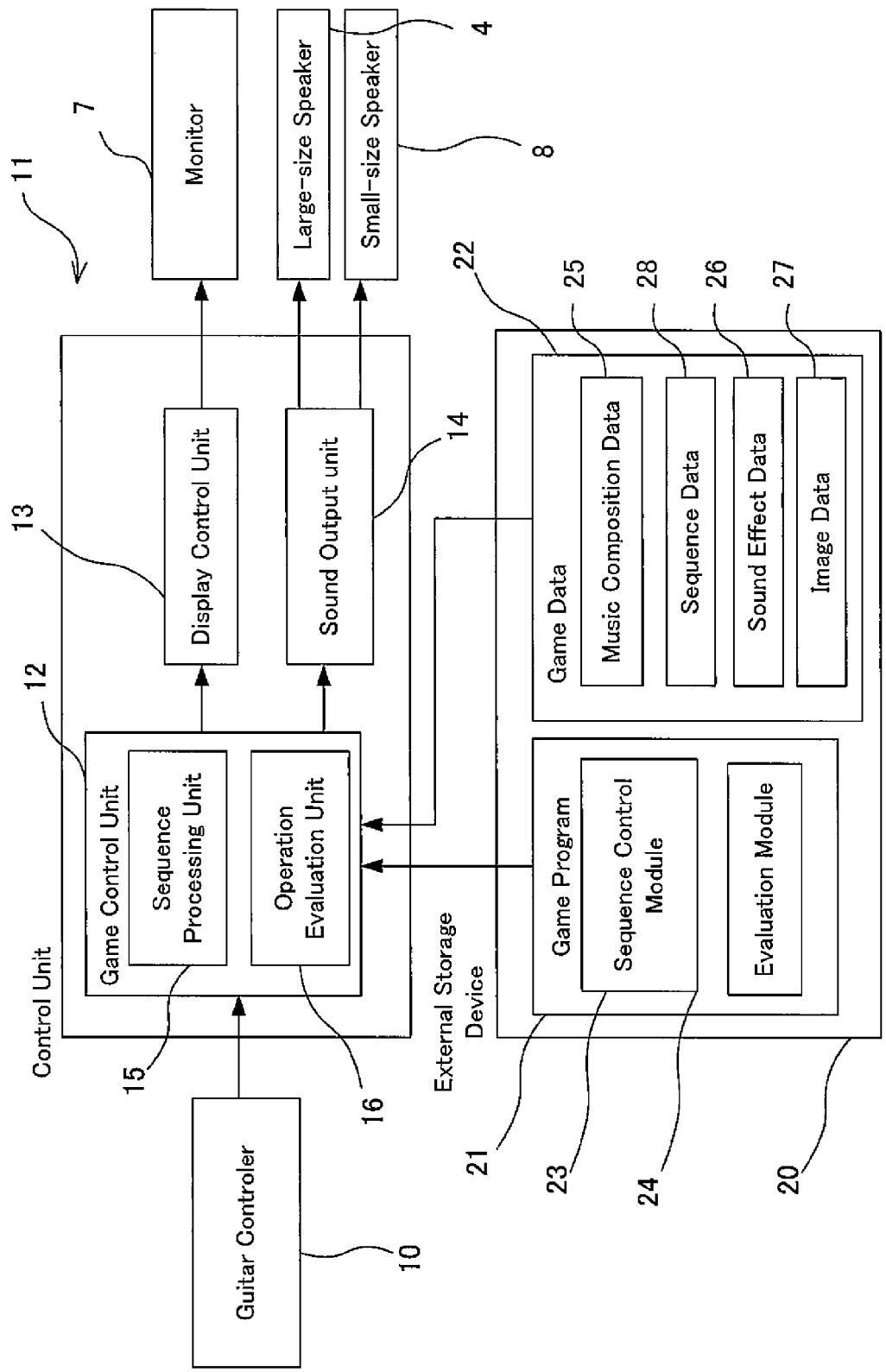
FIG. 3 is a functional block diagram of the game device.

FIG. 3 is a functional block diagram of the game device 1. A control unit 11 as a computer is provided in the chassis 6. As illustrated in FIG. 3, the control unit 11 includes a game control unit 12 serving as a main controller, and a display control unit 13 and a sound output control unit 14, which operate according to the output from the game control unit 12. The game control unit 12 is configured as a unit formed by combining a microprocessor and various peripheral devices such as an internal storage device (for example, ROM and RAM) necessary for the operation of the microprocessor. The display control unit 13 draws an image according to drawing data given from the game control unit 12 on a frame buffer, and outputs a video signal corresponding to the drawn image to the monitor 7, thereby displaying a predetermined image onto the monitor 7. The sound output control unit 14 generates a sound reproducing signal according to sound reproducing data given from the game control unit 12 and outputs the resultant to the speaker 4, 8, thereby reproducing a predetermined music composition (including sound effect) from the speaker 4, 8. The guitar controllers 10 are connected to the control unit 11.

An external storage device 20 is connected to the game control unit 12. Examples of usable external storage device 20 include a storage medium such as an optical storage medium, e.g., DVDROM or CDROM, or a non-volatile semiconductor memory device, e.g., EEPROM, which can hold the data even if power is not supplied thereto. Since the external storage device 20 is connected to the main unit 3, the game control unit 12 can read the various programs and various data pieces stored in the external storage device 20.

The external storage device 20 stores a game program 21 and game data 22. The game program 21 is a computer program necessary for executing a music game on the game device 1 in accordance with a predetermined procedure. The game program 21 includes a sequence control module 23 and an evaluation module 24 for realizing the function according to the present invention. When the chassis 6 is started, the game control unit 12 executes various processes necessary for operating as the game device 1, and sets an environment for executing the music game. When the game control unit 12 executes the sequence control module 23 of the game program 21, a sequence processing unit 15 is generated in the game control unit 12. Also, when the game control unit 12 executes the evaluation module 24 of the game program 21, an operation evaluation unit 16 is generated in the game control unit 12. The sequence processing unit 15 and the operation evaluation unit 16 are logical devices realized by the combination of a computer hardware and a computer program. The sequence processing unit 15 executes a music game process such as a process for instructing to the player to operate with the reproduction of the music (music composition) selected by the player, or a process for generating a production of sound effect etc. according to the operation by the player. The operation evaluation unit 16 executes a process of evaluating the operation and the motion of the player. In addition, the game program 21 also includes various program modules necessary for executing the music game in addition to the above-mentioned modules 23 and 24, and the game control unit 12 has logical devices corresponding to these modules. However, these devices are not illustrated in the figure.

The game data 22 includes various data pieces that should be referred to when the music game is executed in accordance with the game program 21. For example, the game data 22 includes music composition data 25, sound effect data 26, and image data 27. The music composition data 25 is data necessary for reproducing and outputting the music composition, which is the subject of the game, from the speaker 6. In FIG. 1, one type of music composition data 25 is illustrated. However, the player can actually select a music composition to be played from music compositions. The pieces of music composition data 25 are recorded in the game data 22 with the information for identifying the respective compositions attached thereto. The sound effect data 26 is data in which types of sound effects that should be output from the speaker 4, 8, in response to the operation of the player are recorded as associated with a unique code for every sound effect. The sound effect includes a sound of a musical instrument and various other types of sound. The sound effect data is prepared in a predetermined octave number with a pitch changed. The image data 27 is data for displaying a background image, various objects, icons, etc. in the game screen on the monitor 7.

The game data 22 further includes sequence data 28. The sequence data 28 is data defining an operation that should be instructed to the player. At least one piece of sequence data 28 is prepared for one music composition data 25. The details of the sequence data 28 will be described later. In addition, the control unit 11 is not limited to the embodiment in which various pieces of data including the program are stored in the external storage device 20. For example, various pieces of data may be acquired by a communication device.

Figure 4:
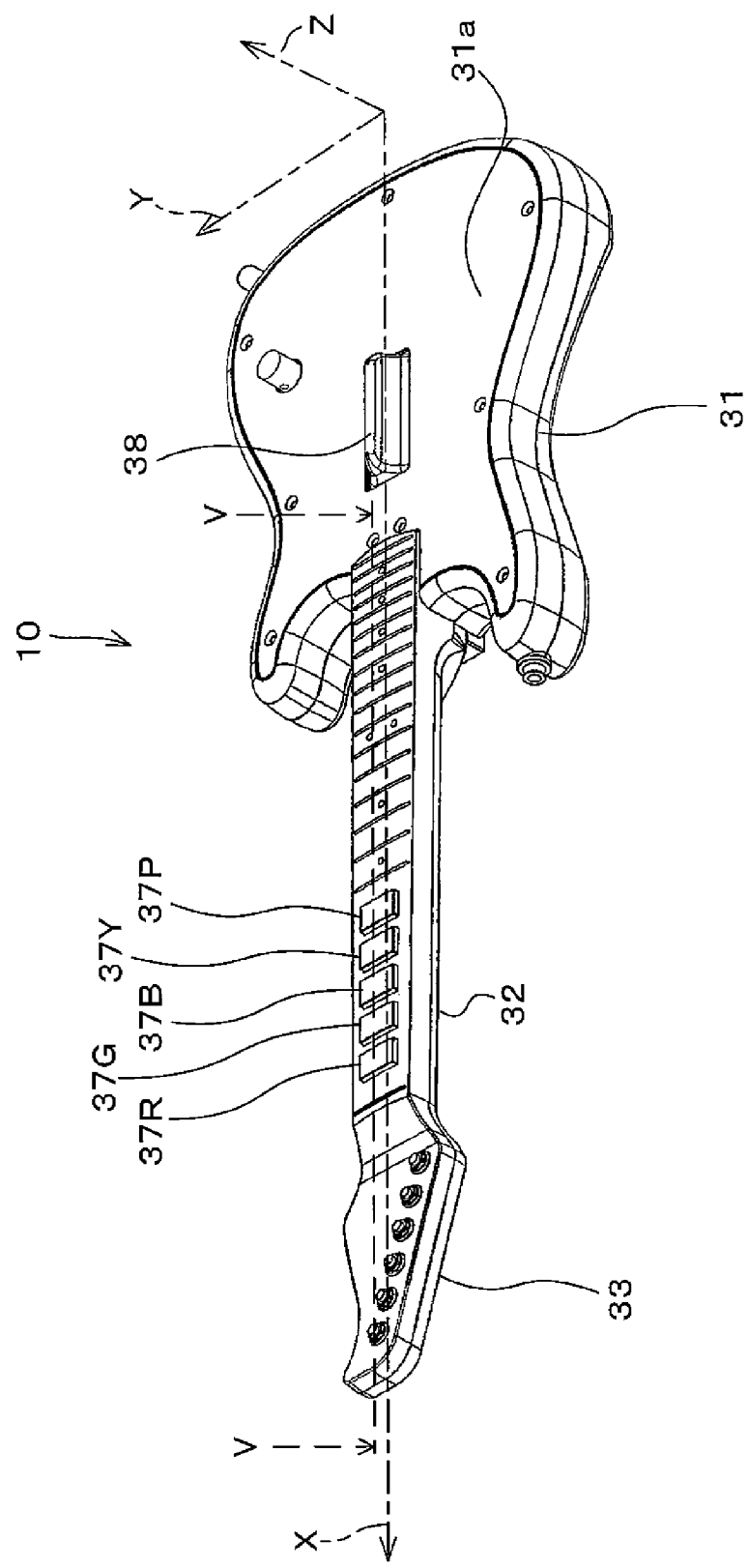
FIG. 4 is an enlarged perspective view of a guitar controller.

FIG. 4 is an enlarged perspective view of the guitar controller 10. In a shape, a size or the like, the guitar controller 10 imitates what is called a guitar. The guitar controller 10 includes a body portion 31, a neck portion 32 that extends from the body portion 31, and a head portion 33 that is attached to a leading end of the neck portion 32. In each guitar controller 10, the body portion 31 is placed on hooks 35 provided on the left and the right of the chassis 6 while a movement of the head portion 33 is restricted by frames 34, which are provided on the left and right upper part of the monitor 7. The guitar controller 10 is connected to the control unit 11 in the chassis 6 so that the transmission and the reception of information are possible. In the neck portion 32, five fret buttons 37R, 37G, 37B, 37Y, and 37P, which are color-coded into red, green, blue, yellow, and pink, are sequentially provided as the operation portion from the neighborhood of the head portion 33 toward the side of the body portion 31. When the player performs a selection operation to select each of the fret buttons 37R to 37P, a different selection signal is output according to the fret buttons 37R to 37P. The fret buttons 37R to 37P function as the operation portion of the invention.

A picking lever 38 is provided near the center of the body portion 31. The picking lever 38 is used to simulate an operation to pluck the strings of the guitar, and the picking lever 38 is operated by the player like the strings of the guitar. Therefore, the picking lever 38 is configured such that rotation motion can be performed within a given range in a Y-axis direction which will be described later while attaching portion attached to the body portion 31 is used as a support shaft. An elastic member (not illustrated) is provided in the attaching portion of the picking lever 38 such that the picking lever 38 is retained in the substantially center of the given range where the rotation motion can be performed. An operation detecting sensor (not illustrated) is provided in the picking lever 38. Therefore, when the player performs an operation to rotate the picking lever 38, the guitar controller 10 can detect the operation and output a signal of the operation. The player holds the guitar controller 10 as if the player holds the guitar, and the player operates the fret buttons 37R to 37P and the picking lever 38 of the guitar controller 10 as if the player plays the guitar.

Figure 5:
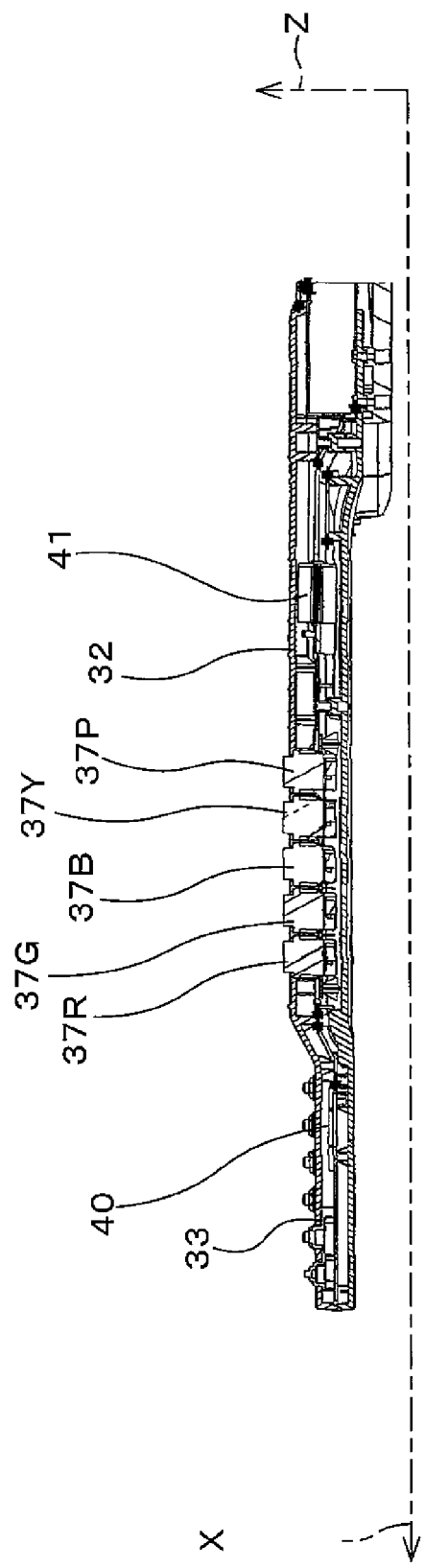
FIG. 5 is a sectional view taken on a line V-V of FIG. 4.

FIG. 5 is a sectional view taken on a line V-V of FIG. 4. As illustrated in FIG. 5, a triaxial acceleration sensor 40 as an acceleration detecting device detecting acceleration is provided in the head portion 33. The triaxial acceleration sensor 40 can detect the acceleration with respect to three axes of an X-axis, a Y-axis, and a Z-axis of FIG. 4. The X-axis indicates one that is oriented from a base of the neck portion 32 of the guitar controller 10 toward the leading end of the neck portion 32, the Y-axis indicates one that is parallel to an upper surface 31a of the body portion 31 of the guitar controller 10 and orthogonal to the X-axis, and the Z-axis indicates one that is oriented from the upper surface 31a of the body portion 31 of the guitar controller 10 toward the vertical direction, namely, orthogonal to both the X-axis and the Y-axis. Also, as illustrated in FIG. 5, in the neck portion 32, there is provided a vibration motor 41 as a vibration generating device generating the vibration near the body portion 31. That is, while the fret buttons 37R to 37P are sandwiched between the triaxial acceleration sensor 40 and the vibration motor 41, the triaxial acceleration sensor 40 is disposed in the head portion 33, and the vibration motor 41 is disposed near the body portion 31 of the neck portion 32. The guitar controller 10 is configured to be able to output information of the acceleration detected by the triaxial acceleration sensor 40. An operation of the vibration motor 41 is controlled by the control unit 11. In addition, operation buttons (not illustrated) may be provided in the guitar controller 10 in order to select, stop or the like the progression of the game etc.

Returning to FIGS. 1 and 2, the two large-size speakers 4 are disposed on the left and right while the main unit 3 is sandwiched therebetween. Each of the large-size speakers 4 includes an upper speaker 43 and a lower speaker 44. The two large-size speakers 4 are disposed such that a speaker surface 43a of the upper speaker 43 and a speaker surface 44a of the lower speaker 44 are oriented toward the player, namely, the speaker surfaces 43a and 44a are oriented toward a central direction.

Figure 6:
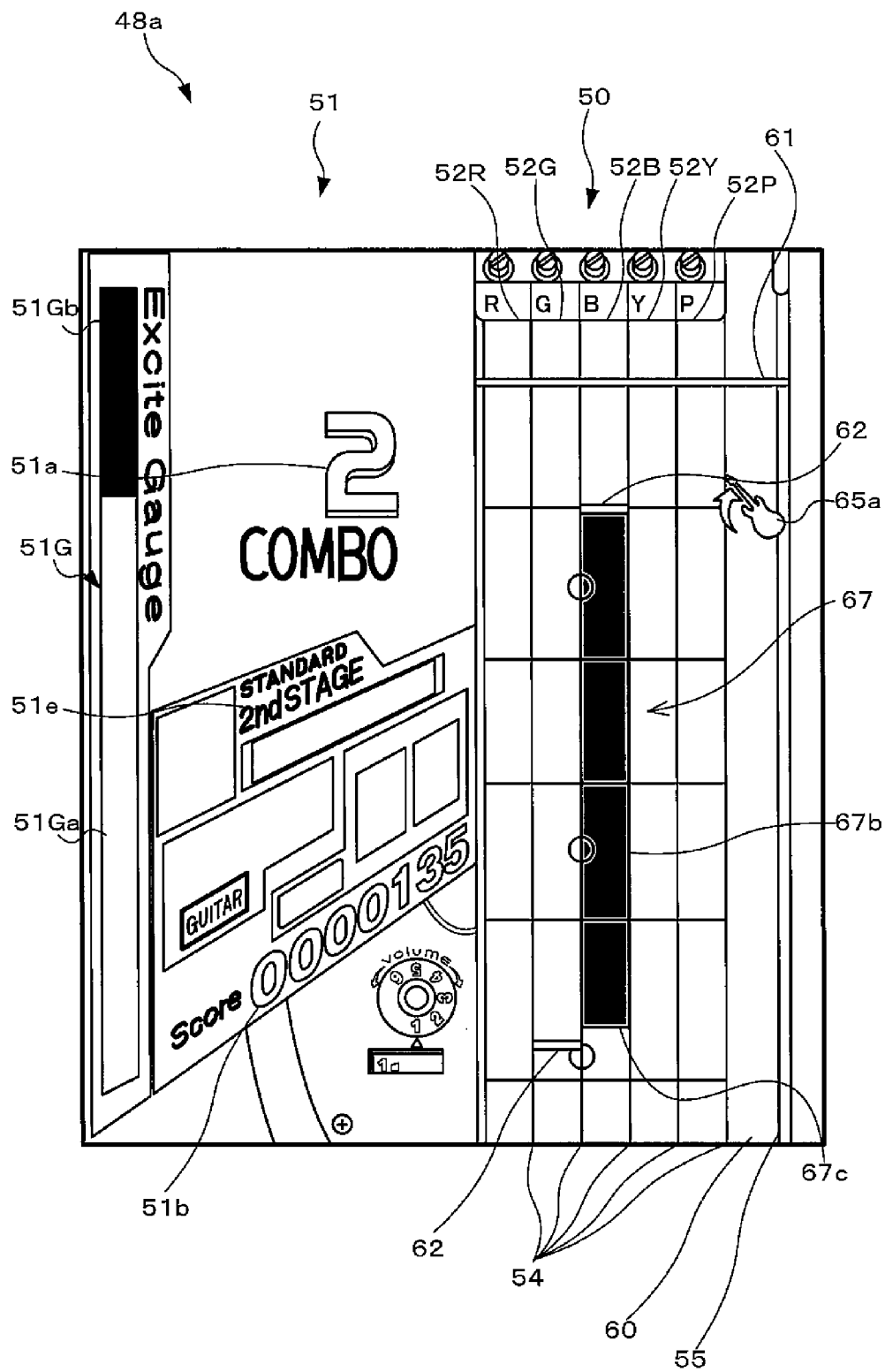
FIG. 6 illustrates a game screen including an operation instruction to rotate a neck portion of a guitar controller such that the neck portion is directed upright.
Figure 7:
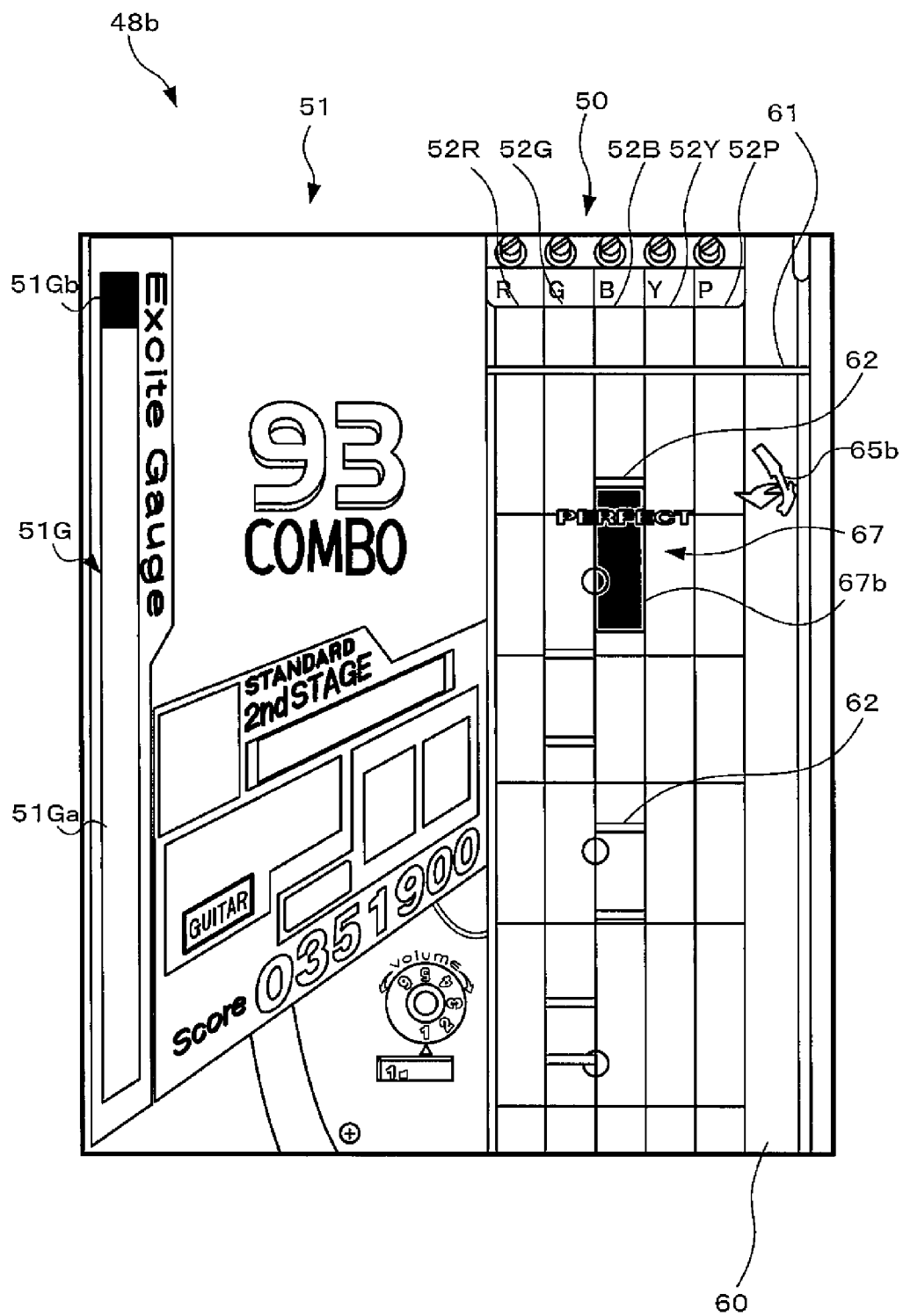
FIG. 7 illustrates a game screen including an operation instruction to horizontally rotate a head portion of the guitar controller.
Figure 8:
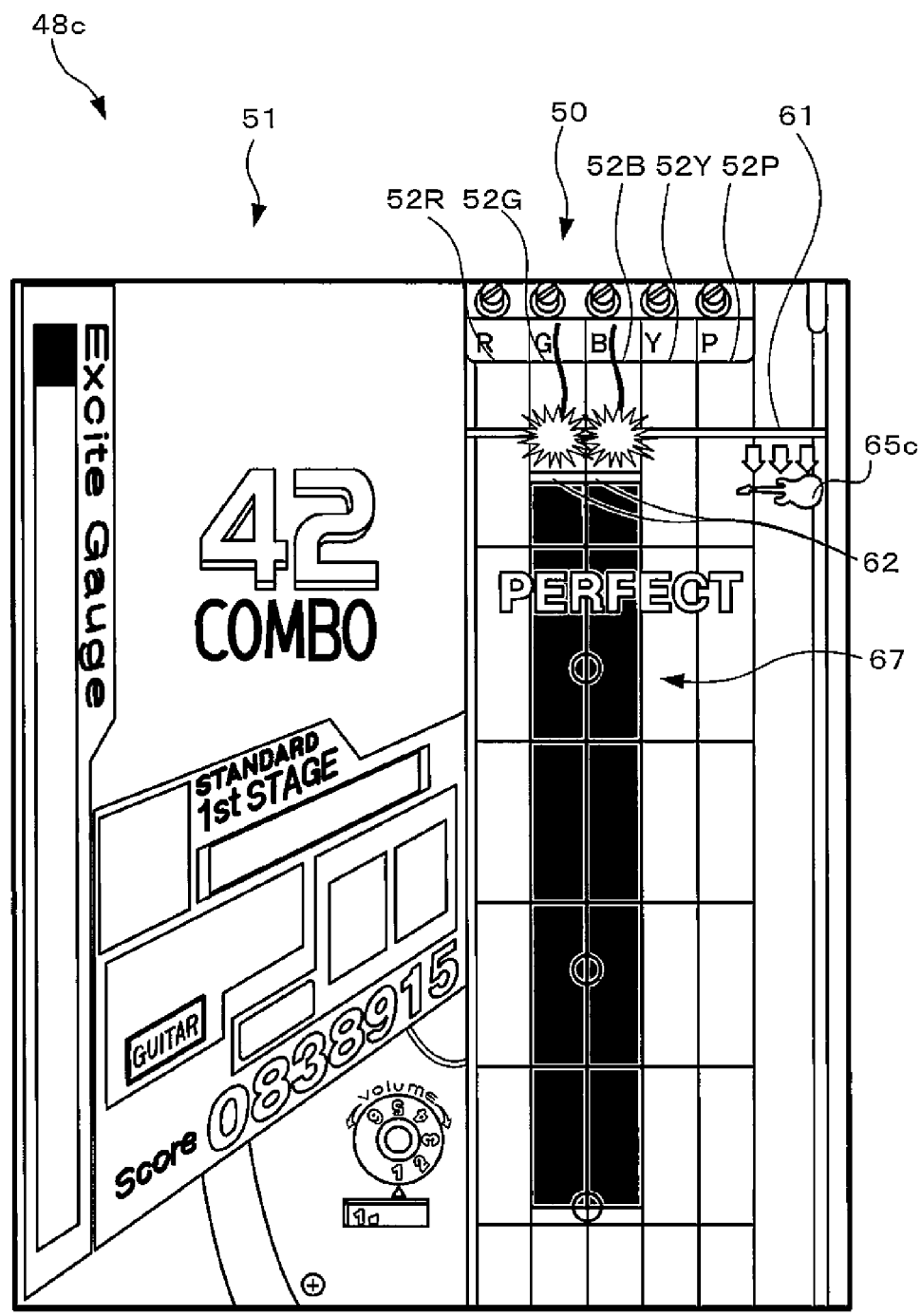
FIG. 8 illustrates a game screen including an operation instruction to move the guitar controller in a Y-axis direction in accordance with a jump of a player.

An outline of the game will be described with reference to FIGS. 6 to 8. FIGS. 6 to 8 illustrate game screens including instructions of motions issued to the player in addition to instructions of operation moments of the fret buttons 37R to 37P and the picking lever 38. FIG. 6 schematically illustrates a game screen 48a including a instruction of a motion to rotate the neck portion 32 of the guitar controller 10 such that the neck portion 32 is directed upright, FIG. 7 schematically illustrates a game screen 48b including a instruction of a motion to horizontally rotate the head portion 33 of the guitar controller 10, and FIG. 8 schematically illustrates a game screen 48c including a instruction of a motion to move the guitar controller 10 in the Y-axis direction in accordance with a jump of the player. As illustrated in FIGS. 6 to 8, the game screen includes an operation instruction region 50, and an information display region 51 where various pieces of information are displayed. Various pieces of information such as an evaluation and an evaluation continuous number 51a, a total sum of acquired score 51b, a type of playing stage 51e, and a life 51G that is reduced depending on a play situation are displayed in the information display region 51. The life 51G is formed as a gauge. As the life 51G is reduced, a length of a remaining region 51Ga is shortened while a length of an empty region 51Gb is lengthened reversely. In addition, pieces of information such as a difficulty level and a playback music title may be included in the information display region 51.

Five vertically-extending lanes 52R, 52G, 52B, 52Y, and 52P are displayed in the operation instruction region 50 while separated by thin separator lines 54. In the lanes 52R to 52P, an R-lane 52R, a G-lane 52G, a B-lane 52B, a Y-lane 52Y, and a P-lane 52P are disposed in order from left to right. The R-lane 52R corresponds to the red fret button 37R of the guitar controller 10, and a character "R" indicating a corresponding color is displayed in a top of the R-lane 52R. The G-lane 52G corresponds to the green fret button 37G, and a character "G" is displayed in a top of the G-lane 52G. The B-lane 52B corresponds to the blue fret button 37B, and a character "B" is displayed in a top of the B-lane 52B. The Y-lane 52Y corresponds to the yellow fret button 37Y, and a character "Y" is displayed in a top of the Y-lane 52Y. The P-lane 52P corresponds to the pink fret button 37P, and a character "P" is displayed in a top of the P-lane 52P. The right side of the P-lane 52P is divided by a bold separator line 55, whereby an motion instruction lane 60 is formed between the thin separator line 54 and the bold separator line 55. An operation reference sign 61 that traverses the lanes 52R to 52P and 60 is displayed in an upper end portion of each of the lanes 52R to 52P and 60. In accordance with execution of the music game, the music is reproduced, and an object 62 is properly displayed as an operation instruction sign in each of the lanes 52R to 52P.

The object 62 emerges in a lower end portion of each of the lanes 52R to 52P in a right time of the music, and the object 62 is scrolled upward with the progress of the music as illustrated by an arrow of FIG. 6. The player is required to perform a performance operation, in which the picking lever 38 is operated according to an arrival of the object 62 at the operation reference sign 61 while the fret buttons 37R to 37P of the guitar controller 10 are selected corresponding to the lanes 52R to 52P on each of which the object 62 is displayed. A time lag between a time the object 62 is matched with the operation reference sign 61 and a time the player performs the performance operation is detected when the player performs the performance operation. The operation of the player is highly evaluated with decreasing the time lag. A sound effect corresponding to the selection of each of the fret buttons 37R to 37P is reproduced from the speakers 4 and 8 according to the performance operation. In the example of FIG. 6, the object 62 is located immediately before arriving at the operation reference sign 61 in the B-lane 52B, and the player may perform the performance operation to operate the picking lever 38 according to the arrival of the object 62 while selecting the blue fret button 37B of the guitar controller 10.

In accordance with the execution of the music game, motion instruction signs 65a to 65c are displayed in the motion instruction lane 50. The motion instruction signs 65a to 65c are expressed by an motion instruction sign 65 unless distinguished from one another. In the examples of FIGS. 6 to 8, images 65a to 65c, in which an image simulating the guitar controller 10 that corresponds to the required operation and an arrow indicating a motion direction provided to the guitar controller 10 are combined, are used as the motion instruction sign 65. Similarly to the object 62, the motion instruction sign 65 emerges in the lower end portion of the motion instruction lane 50 in the right time of the music, and the motion instruction sign 65 is scrolled upward with the progress of the music. The player is required to perform a predetermined motion according to the arrival of the motion instruction sign 65 at the operation reference sign 61. The predetermined motion includes the motion to rotate the neck portion 32 of the guitar controller 10 such that the neck portion 32 is directed upright, the motion to horizontally rotate the head portion 33 of the guitar controller 10, and the motion to move the guitar controller 10 in the Y-axis direction in accordance with the jump of the player. FIG. 6 illustrates the image 65a of the motion instruction sign 65 corresponding to the motion to rotate the neck portion 32 of the guitar controller 10 such that the neck portion 32 is directed upright, FIG. 7 illustrates the image 65b of the motion instruction sign 65 corresponding to the motion to horizontally rotate the head portion 33 of the guitar controller 10, and FIG. 8 illustrates the image 65c of the motion instruction sign 65 corresponding to the motion to move the guitar controller 10 in the Y-axis direction in accordance with the jump of the player. In the example of FIG. 6, according to the arrival of the image 65a of the motion instruction sign 65 at the operation reference sign 61, the player may perform the motion to rotate neck portion 32 of the guitar controller 10 from a usual performance posture, in which the neck portion 32 is laterally oriented, such that the neck portion 32 is directed upright. In the example of FIG. 7, according to the arrival of the image 65b of the motion instruction sign 65 at the operation reference sign 61, the player may perform the motion to horizontally rotate the head portion 33 from the lateral position of the player toward the front of the player such that the head portion 33 is located in front of the player. In the example of FIG. 8, according to the arrival of the image 65c of the motion instruction sign 65 at the operation reference sign 61, the player may perform the motion to move the neck portion 32 downward in the vertical direction, namely, the player may perform the motion to move the head portion 33 downward in the Y-axis direction from the usual performance posture in which the head portion 33 is located beside the player. In examples of FIGS. 6 to 8, since the predetermined operation is required corresponding to the performance operation, the motion instruction sign 65 is scrolled in synchronization with the corresponding object 62. The motion instruction sign 65 is not limited to the configuration in which the motion instruction sign 65 is scrolled in synchronization with the corresponding object 62. The motion instruction sign 65 may be scrolled independently from the object 62.

Each of the game screens of FIGS. 6 to 8 includes an instruction of a vibrato operation. As used herein, the vibrato operation means a performance technique performed in an actual guitar performance and a simulated operation of the performance technique in which the string held by a left hand is finely trembled. In this embodiment, the vibrato operation means a motion to shake the neck portion 32 in the Y-axis direction while the selection of each of the fret button 37R to 37P is maintained. As illustrated in FIGS. 6 to 8, a long object 67 issuing an instruction to maintain the selection state of each of the fret buttons 37R to 37P is displayed in each of the lanes 52R to 52P in accordance with the execution of the music game. In this embodiment, the long object 67 is also used as a motion instruction sign of a motion to perform the motion corresponding to the vibrato operation. Therefore, the motion corresponding to the vibrato operation, which is instructed by the long object 67, is included in a predetermined motion that is required according to the arrival of the long object 67 at the operation reference sign 61. The long object 67 includes the object 62 that is located at the upper end, and a belt portion 67b that extends downward into a belt shape along the lanes 52R to 52P from the object 62 at the upper end. Similarly to the object 62, the long object 67 emerges in the lower end portion of each of the lanes 52R to 52P in the right time of the music, and the long object 67 is scrolled upward according to the progress of the music as illustrated by the arrow of FIG. 6. The player is required to perform a performance operation, in which the picking lever 38 is operated according to the arrival of the object 62 constituting the long object 67 at the operation reference sign 61 while the fret buttons 37R to 37P of the guitar controller 10 are selected corresponding to the lanes 52R to 52P on each of which the object 62 is displayed. Additionally, the player is required to maintain the selection of each of the fret buttons 37R to 37P corresponding to the lanes 52R to 52P on each of which the object 62 is displayed while the belt portion 67b constituting the long object 67 is located on the operation reference sign 61, and the player is required to perform an motion to shake the neck portion 32 in the Y-axis direction while the selection of each of the fret buttons 37R to 37P is maintained. In the example of FIG. 6, since the long object 67 is displayed in the B-lane 52B, the player may perform the vibrato operation along with the performance operation, in which the picking lever 38 is operated according to the arrival of the object 62 at the operation reference sign 61 while the blue fret button 37B of the guitar controller 10 is selected. That is, according to the arrival of the object 62 constituting the long object 67 at the operation reference sign 61, the player may perform the operation to shake the neck portion 32 in the vertical direction, namely, the operation to shake the neck portion 32 in the Y-axis direction along with the above performance operation until a lower end 67c of the belt portion 67b passes through the operation reference sign 61.

The motion of the player is detected by the triaxial acceleration sensor 40, and compared to various pieces of data such as a previously-set raising speed, a raising angle, and a vibration time to determine whether a predetermined condition is satisfied. When the predetermined condition is satisfied, the time lag between the time the motion of the player is performed and the time the motion instruction sign 65 is matched with the operation reference sign 61 is detected. The higher the motion of the player is evaluated, the less the time lag is. A benefit such as a bonus point and a recovery of the life 51G is provided according to the evaluation. While the vibrato operation is performed, the vibration motor 41 vibrates the guitar controller 10 so as to create the vibrato performance. The life 51G is recovered according to a duration time of the vibrato operation. In addition, the benefit corresponding to the vibrato operation is not limited to the recovery of the life 51G. For example, the bonus point may be used as the benefit.

Figure 9:
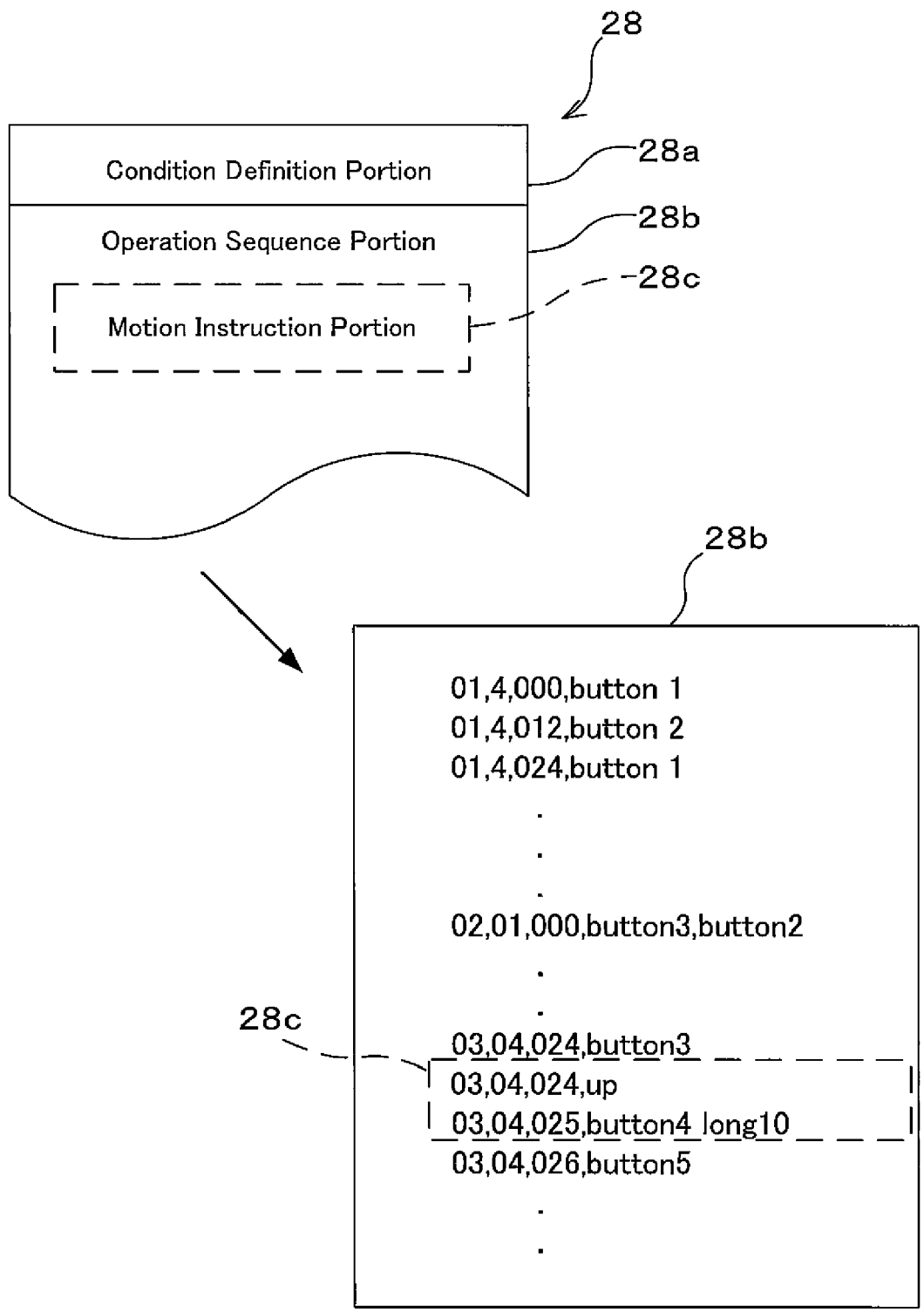
FIG. 9 is a view illustrating an example of a content of sequence data.

The detailed sequence data 28 will be described with reference to FIG. 9. As illustrated in FIG. 9, the sequence data 28 includes a condition definition portion 28a and an operation sequence portion 28b. In condition definition portion 28a, there are described pieces of information specifying various conditions for executing the game, such as a tempo, a beat, and a track of the music, information specifying the sound effect that should be generated when each of the fret buttons 37R to 37P is operated, information specifying a correspondence relationship between the lag of the operation moment and the evaluation.

On the other hand, the operation moments or the motion moments of the lanes 52R to 52P and 60 are described in the operation sequence portion 28b while correlated with information specifying any one of the lanes 52R to 52P and 60. That is, as partially illustrated in FIG. 9, the operation sequence portion 28b is constructed as a set of records creating an association between the moment (operation moment) in which the operation or the motion should be performed in the music and the operation portion (each of the fret button 37R to 37P) or the motion. In the operation moment and the motion moment, a bar portion of the music, the number of beats, and a value indicating the time in the beat are described while delimited by a comma. The time in the beat is an elapsed time from a beginning of one beat, and the time in the beat is expressed by the number of units from the beginning while a time length of one beat is equally divided into n unit times. For example, the time in the beat is described as "01, 2, n/4" when the time that, in the second beat of the first bar of the music, elapses by ¼ from the beginning of the beat is specified as the operation moment or the motion moment.

In the specification of each of the fret buttons 37R to 37P, "button 1" to "button 5" are described while unique numbers corresponding to the fret buttons 37R to 37P are added to "button". That is, the fret button 37R is described as "button 1", the fret button 37G is described as "button 2", the fret button 37B is described as "button 3", the fret button 37Y is described as "button 4", and the fret button 37P is described as "button 5". The specification of each of the fret buttons 37R to 37P corresponds to the specification of each of the lanes 52R to 52P corresponding to the fret button 37R to 37P. That is, the description of "button 1" corresponds to the specification of the R-lane 52R, the description of "button 2" corresponds to the specification of the G-lane 57G, the description of "button 3" corresponds to the specification of the B-lane 57B, the description of "button 4" corresponds to the specification of the Y-lane 57Y, and the description of "button 5" corresponds to the specification of the P-lane 57P. In the example of FIG. 9, the picking lever 38 is operated while the operation to select the fret button 37R is performed at a starting time point (000) of the fourth beat of the first bar, and the picking lever 38 is operation while the operation to select the fret button 37G is performed at the time "0012" elapses since the starting time point of the fourth beat of the first bar. Also, the picking lever 38 is operated while the operation to simultaneously select the fret button 37B and the fret button 37G is performed at the starting time point (000) of the first beat of the second bar.

The operation sequence portion 28b includes a motion instruction portion 28c in which the moment at which the predetermined operation should be performed is described while correlated with the time in the music. For example, the description of "up" is included in the motion instruction portion 28c in the case of the motion instruction to rotate the neck portion 32 of the guitar controller 10 such that the neck portion 32 is directed upright, the description of "side" is included in the motion instruction portion 28c in the case of the motion instruction to horizontally rotate the head portion 33 of the guitar controller 10, and the description of "jump" is included in the motion instruction portion 28c in the case of the motion instruction jump to the player. The motion instruction portion 28c includes a description specifying the operation moment of the vibrato operation. For example, the specification of the vibrato operation is described as "button 4 long 10" so as to include the specification of each of the fret buttons 37R to 37P and the specification of the duration time of the vibrato operation. In this case, "button 4" specifies the fret button 37Y, "long" specifies the vibrato operation, and "10" specifies the duration time of the vibrato operation. In the example of FIG. 9, at the moment that elapses by "0024" from the starting time point of the fourth beat of the third bar, the player performs the motion to rotate the neck portion 32 of the guitar controller 10 such that the neck portion 32 is directed upright. At the moment that elapses by "0025" from the starting time point of the fourth beat of the third bar, the player operates the picking lever 38 while selecting the fret button 37Y, and the player starts the vibrato operation. And the player continues the vibrato operation until the time elapses by "10" since the vibrato operation is started.

In FIG. 9, the condition definition portion 28a is provided only in the head of the sequence data 28. However, the condition definition portion 28a may be provided in a proper position in the middle of the operation sequence portion 28b. Therefore, pieces of processing such as a change of the tempo and a change of allocation of the sound effect can be performed in the music. Pieces of sequence data 28 having different difficulty levels may be previously prepared for the same music. In this case, information determining the difficulty level is added to each of the pieces of sequence data 28.

The sequence processing unit 15 of the game control unit 12 controls the display such that each of the objects 62 and 67 is matched with the operation reference sign 61 at the operation moment specified by the sequence data 28 and such that the motion instruction sign 65 is matched with operation reference sign 61 at the motion moment specified by the sequence data 28.

The processing of the game control unit 12 in executing the music game in the game device 1 will be described below. One or two persons play the game device 1 by inserting a predetermined coin through the coin insertion slot 17. Each player uses the guitar controller 10. After reading the game program 21 to perform an initial setting necessary to execute the music game, the game control unit 12 stands by for the instruction to start the game from the player. The instruction to start the game includes a operation to specify data used in the game, such as the music played in the game and the selection of the difficulty level. A procedure for receiving the instructions may be identical to those of well-known music games.

When the instruction to start the game is issued, the game control unit 12 reads the music composition data 25 corresponding to the music selected by the player, and outputs the music composition data 25 to the sound output control unit 14, thereby starting the playback of the music from the speakers 4 and 8. Therefore, the control unit 10 acts as the music playback device. The game control unit 12 reads the sequence data 28 corresponding to the selection of the player in synchronization with the playback of the music, and the game control unit 12 generates the necessary image data 27 including the operation instruction region 50 and the information display region 51 while referring to the image data 27, thereby outputting the generated image data 27 to the display control unit 13. Therefore, the necessary image including the operation instruction region 50 and the information display region 51 is displayed on the monitor 7. During the execution of the music game, the game control unit 12 repeatedly performs a sequence processing routine illustrated in FIG. 10 and motion evaluation processing illustrated in FIG. 11 as processing necessary to perform the display in the operation instruction region 50 in a predetermined cycle. The sequence processing unit 15 performs the routine of FIG. 10, and the motion evaluation unit 16 performs the routine of FIG. 11.

Figure 10:
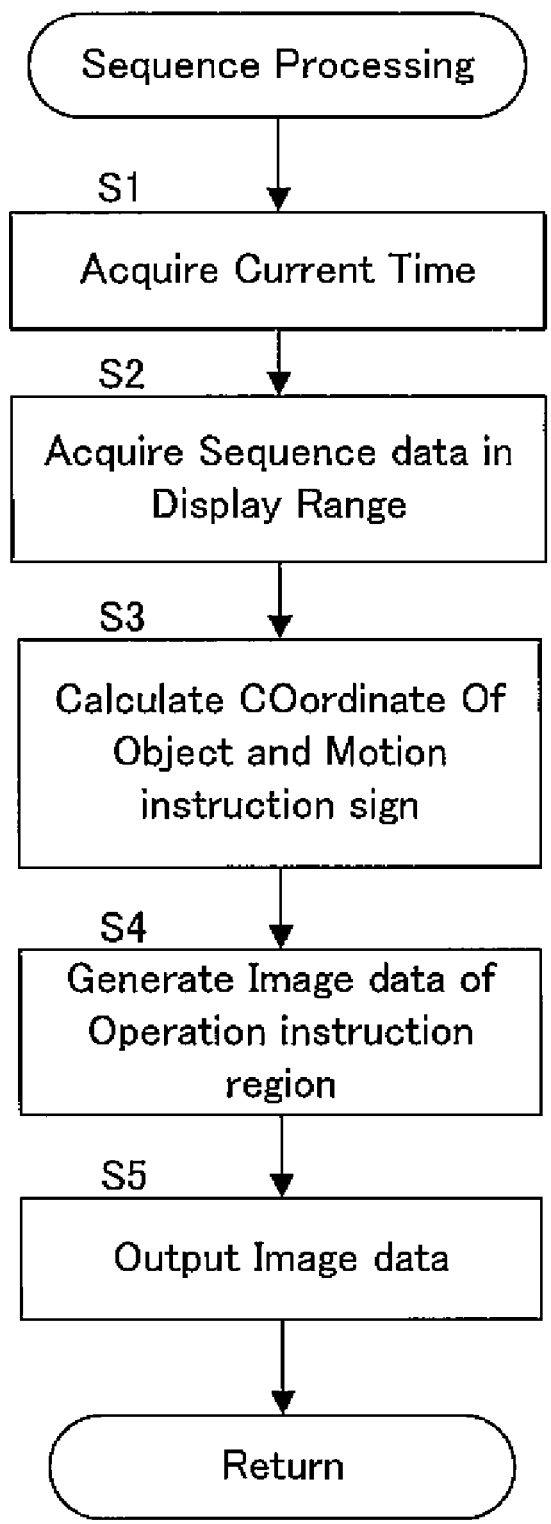
FIG. 10 is a flowchart illustrating an example of a sequence processing routine executed by a game control unit.

When the sequence processing routine of FIG. 10 is started, the sequence processing unit 15 of the game control unit 12 acquires a current time on the music in Step S1. For example, the current time may be calculated with an internal clock of the game control unit 12 based on a playback starting time point of the music as a reference. In Step S2, the sequence processing unit 15 acquires data of a time length (display range) that should be displayed in the operation instruction region 60 from the sequence data 28. For example, the display range is set to the time length corresponding to two bars of the music from the current time.

In Step S3, the sequence processing unit 15 calculates coordinates in the operation instruction region 50 for all the objects 62 and the motion instruction signs 65 and 67, which should be displayed in the lanes 52R to 52P, 60. For example, the calculation is performed as follows. A determination which lanes 52R to 52P and 60 the objects 62 and motion instruction signs 65 and 67 should be displayed in is made based on the specification of each of the lanes 52R to 52P and 60, which corresponds to the operation moment included in the display range, namely, based on one of the specification of each of "button 1" to "button 5", the specification of the motion such as "up", and the specification of the vibrato operation such as "button 4 long 10". A determination that positions of the objects 62 and the motion instruction signs 65 and 67 on the lanes 52R to 52P and 60 in a temporal axis direction (that is, movement directions of the objects 62 and the motion instruction signs 65 and 67) from the operation reference sign 61 is made according to the time lag between each operation moment and the current time. Therefore, the coordinates of the objects 62 and the motion instruction signs 65 and 67, which are necessary to dispose the objects 62 and the motion instruction signs 65 and 67 along the temporal axis from the operation reference sign 61 on the specified lanes 52R to 52P and 60, can be acquired.

In Step S4, based on the coordinates of the objects 62 and the motion instruction signs 65 and 67, which are calculated in Step S3, the sequence processing unit 15 generates the image data necessary to draw the operation instruction region 50. Specifically, the image data is generated such that the objects 62 and the motion instruction signs 65 and 67 are disposed in the calculated coordinates. The images of the lanes 52R to 52P and 60, the objects 62, and the motion instruction signs 65 and 67 may be acquired from the image data 27.

In Step S5, the sequence processing unit 15 outputs the image data to the display control unit 13. Therefore, the operation instruction region 50 is displayed on the monitor 7. After the processing in Step S5, the sequence processing unit 15 ends the current sequence processing routine. Through the above processing, the objects 62 and the motion instruction signs 65 and 67 are moved and displayed on the lanes 52R to 52P and 60 such that the objects 62 arrives at the operation reference sign 61 at the operation moment described by the sequence data 28 and such that the motion instruction signs 65 and 67 arrives at the operation reference sign 61 at the motion moment described by the sequence data 28.

Figure 11:
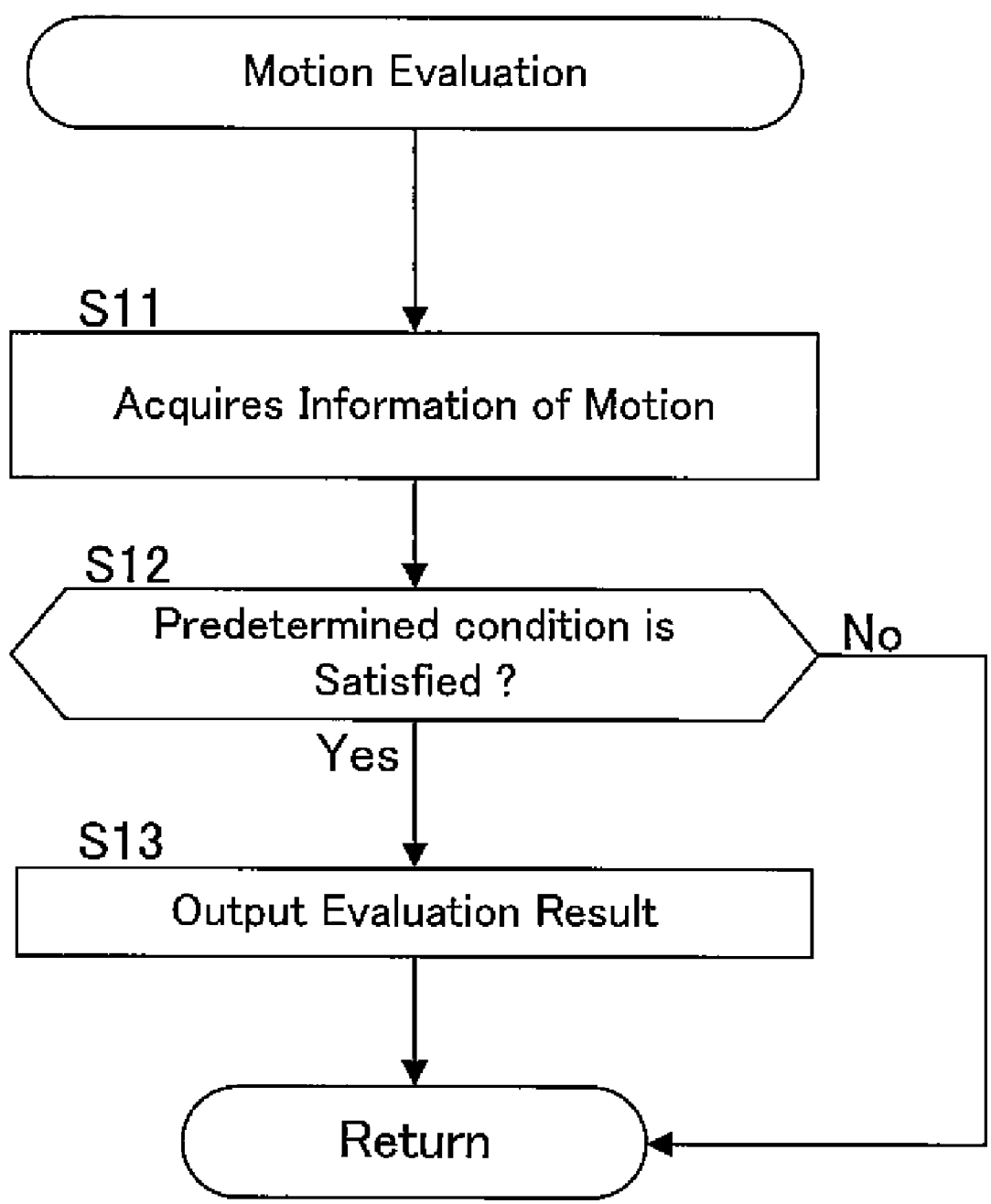
FIG. 11 is a flowchart illustrating an example of an motion evaluation routine executed by the game control unit.

The motion evaluation routine of FIG. 11 will be described below. When the motion evaluation routine of FIG. 11 is started, in Step S11, the operation evaluation unit 16 refers to the output signal of the triaxial acceleration sensor 40, and acquires the information of the motion provided to the guitar controller 10.

In Step S12, there is determined whether the information of the motion acquired in Step S11 satisfies a predetermined condition. In Step S12, for example, the operation evaluation unit 16 compares latest acceleration information of the Y-axis direction with acceleration information of a past given time. When a difference in the given time exceeds a positive value, the operation evaluation unit 16 determines that the neck portion 32 is vertically shaken (shaken upward), and determines that the predetermined condition corresponding to the motion instruction to rotate the neck portion 32 of the guitar controller 10 such that the neck portion 32 is directed upright is satisfied. Also, for example, the operation evaluation unit 16 compares latest acceleration information of the Z-axis direction with acceleration information of the past given time. When the difference in the given time exceeds a predetermined value (positive or negative is not considered), the operation evaluation unit 16 determines that the neck portion 32 is horizontally shaken, and determines that the predetermined condition corresponding to the motion instruction to horizontally rotate the head portion 33 of the guitar controller 10 is satisfied. And, for example, the operation evaluation unit 16 compares latest acceleration information of the Y-axis direction with acceleration information of a past given time shorter than that of another predetermined condition. When a difference in the given time shorter than that of another predetermined condition exceeds a predetermined negative value, the operation evaluation unit 16 determines that the neck portion 32 is vertically shaken (moved downward), and determines that the predetermined condition corresponding to the jump motion instruction is satisfied. Also, for example, the operation evaluation unit 16 compares the latest acceleration information of the Y-axis direction with the acceleration information of the past given time during a time period in which the vibrato operation instruction is issued. When a difference in the given time exceeds a predetermined positive value, the operation evaluation unit 16 determines that the predetermined condition corresponding to the vibrato operation instruction is satisfied. On the other hand, when the negative determination is made in Step S12, the subsequent pieces of processing are skipped to end the current routine. In Step S13, the operation evaluation unit 16 outputs the evaluation result that various motion instructions are satisfied based on the result in Step S12, and ends the current routine.

In addition, the operation evaluation unit 16 also performs the evaluation processing to each of the lanes 52R to 52P, the detailed this evaluation processing is omitted. A well-known routine may be used as this evaluation processing.

As described above, according to the game device 1 of this embodiment, since the triaxial acceleration sensor 40 is incorporated in the guitar controller 10, the motion provided to the guitar controller 10 by the player can be detected. Also, since the vibration motor 41 is incorporated in the guitar controller 10, the guitar controller 10 can be vibrated corresponding to the motion detected with the triaxial acceleration sensor 40. Therefore, since the guitar controller 10 is vibrated such that the vibrato operation is detected to create the vibrato performance, the performance feeling of the vibrato performance can be enhanced. The player's left hand is placed on the fret buttons 37R to 37P during the play of the game, since the guitar controller 10 is operated such that actual guitar is played. Since the triaxial acceleration sensor 40 and the vibration motor 41 are disposed while the fret buttons 37R to 37P are sandwiched therebetween, the vibration generated by the vibration motor 41 can be decayed by the player's hand placed in front of the triaxial acceleration sensor 40. Therefore, the triaxial acceleration sensor 40 can be suppressed from mistakenly detecting the vibration generated by the vibration motor 41 as the motion provided by the player.

Various performance techniques of the guitar are used in the operation of the guitar controller 10. However, the head portion is largely moved rather than the body portion in almost all the performance techniques. According to this embodiment, since the triaxial acceleration sensor 40 is provided in the head portion 33, the motion provided to the guitar controller 10 can be detected with better sensitivity. Therefore, the motion provided to the guitar controller 10 can more precisely be recognized. On the other hand, since the vibration generating device is provided in the body portion 31 having the large range of contact with the player, the vibration can effectively be transmitted to the player.

In the above embodiment, the external storage device 20 of the game device 1 functions as the music composition data storage device and the sequence data storage device. The control unit 10 causes the sequence processing unit 15 to perform the routine processing of FIG. 6, whereby the control unit 10 functions as the operation guiding device and the motion guiding device.

The present invention is not limited to the above-described embodiment, however the invention can be implemented in a proper embodiment. Although the vibration generating device is provided to the body portion in the above-described embodiment, the invention is not limited to this embodiment. The vibration generating device may be omitted.

In the above-described embodiment, as the predetermined motions, there is guided the motion corresponding to the vibrato operation, the motion to rotate the neck portion such that the neck portion is directed upright, the motion to horizontally rotate a head portion, and the motion to move the guitar controller 10 in the Y-axis direction in accordance with a jump of the player. However, the predetermined motions are not limited to motions like them. For example, there may be guided a motion for rotating the neck portion. Also, in the above-described embodiment, the long objects are used as the motion instruction signs for the vibrato operations. However, the signs are not limited to the embodiment like them. For example, motion instruction signs different from the long objects may be displayed in the motion instruction lane.

In the above-described embodiment, the guitar controller imitating the guitar is used as the input device. However, the input device is not limited to the embodiment like this. For example, the input device according to the present invention may be embodied as a bass of a similar stringed instrument having a body portion, a neck portion, and a head portion. The present invention is not limited to the input device used for the arcade game device installed in a commercial facility. For example k, the present invention may be embodied as a home-use stationary game device.

REFERENCE SIGN LIST

1 game device
10 guitar controller (input device)
11 control unit (operation guiding device, motion guiding device, music playback device)
20 external storage device (music composition data storage device, sequence data storage device)
31 body portion
32 neck portion
33 head portion
40 triaxial acceleration sensor (acceleration detecting device)
41 vibration motor (vibration generating device)
52R red fret button (operation portion)
52G green fret button (operation portion)
52B blue fret button (operation portion)
52Y yellow fret button (operation portion)
52P pink fret button (operation portion)

What is claimed is:

1. A music game system, comprising:
an input device imitating a stringed instrument, the input device being located within an operational space and including a body portion, a neck portion extending from the body portion, a head portion provided to a leading end of the neck portion, and an acceleration device that can detect acceleration of the input device; and
an operation guiding device that (i) instructs operation of the input device to a player by determining a plurality of operation moments of the input device included in a predetermined time period from a current time toward a future time in a piece of music being played in a game, (ii) displays an operation instruction sign corresponding to each of the plurality of determined operation moments and an operation reference sign corresponding to the current time arranged in a layout along a time axis on a game screen, and (iii) produces a relative displacement between the operation reference sign and each operation instruction sign according to progress of time in the piece of music so that a location of each operation instruction sign coincides with a location of the operation reference sign at the moment along the time axis that the respective operation moment of the input device is expected;

wherein the operation guiding device includes a motion guiding device that (i) instructs the player to perform a predetermined motion of the input device by displaying a motion instruction sign corresponding to a moment at which the player should carry out the predetermined motion of the input device, displayed in the layout along the time axis on the game screen, and (iii) produces a relative displacement between the motion instruction sign and the operation reference sign according to the progress of time in the piece of music so that a location of the motion instruction sign coincides with a location of the operation reference sign at the moment along the time axis that the predetermined motion is expected, wherein the predetermined motion defines a motion of the input device detected by the acceleration device between two positions located within the operational space.

2. The music game system according to claim 1, wherein the input device imitates a guitar as the stringed instrument.

3. The music game system according to claim 1, wherein a triaxial acceleration detecting device that can detect the acceleration in directions of three axes orthogonal to each other including an extending direction of the neck portion is used as the acceleration detecting device.

4. The music game system according to claim 1, wherein the predetermined motion of the input device detected by the acceleration device is a rotation of the neck portion such that the neck portion is directed upright.

5. The music game system according to claim 1, wherein the predetermined motion of the input device detected by the acceleration device is a horizontal rotation of the head portion.

6. The music game system according to claim 1, where the predetermined motion of the input device detected by the acceleration device is a motion of the input device along a vertical axis in accordance with a jump of a player.

7. A music game system comprising:
an input device provided with at least one operation portion for imitating a stringed instrument, the input device being located within an operational space and including a body portion, a neck portion extending from the body portion, a head portion provided to a leading end of the neck portion; and an acceleration device that can detect acceleration of the input device; and
a display device that outputs and displays a game screen;
an audio output device that outputs and plays back game sounds;
a music composition data storage device that stores music composition data for playing back music;
a music playback device that plays back the music from the audio output device based on the music composition data;
a sequence data storage device that stores sequence data describing operation moments of the operation portion during the game; and
an operation guiding device that (i) instructs operation of the input device to a player by determining a plurality of operation moments of the input device included in a predetermined time period from a current time toward a future time in a piece of music being played in a game, (ii) displays an operation instruction sign corresponding to each of the plurality of determined operation moments and an operation reference sign corresponding to the current time arranged in a layout along a time axis on a game screen, and (iii) produces a relative displacement between the operation reference sign and each operation instruction sign according to progress of time in the piece of music so that a location of each operation instruction sign coincides with a location of the operation reference sign at the moment along the time axis that the respective operation moment of the input device is expected;

wherein the operation guiding device includes a motion guiding device that (i) instructs the player to perform a predetermined motion of the input device by displaying a motion instruction sign corresponding to a moment at which the player should carry out the predetermined motion of the input device, displayed in the layout along the time axis on the game screen, and (iii) produces a relative displacement between the motion instruction sign and the operation reference sign according to the progress of time in the piece of music so that a location of the motion instruction sign coincides with a location of the operation reference sign at the moment along the time axis that the predetermined motion is expected, wherein the predetermined motion defines a motion of the input device detected by the acceleration device between two positions located within the operational space.

8. The music game system according to claim 7, wherein the predetermined motion includes a motion in a Y-axis direction which is parallel to an upper face of the body portion and orthogonal to the extending direction of the neck portion.

9. The music game system according to claim 7, wherein the predetermined motion includes a motion in a Z-axis direction which is orthogonal to an upper face of the body portion and orthogonal to the extending direction of the neck portion.

10. The music game system according to claim 7, wherein the predetermined motion includes a motion of the head portion from a position beside the player to a position in front of the player.

11. The game system according to claim 7, wherein the predetermined motion includes a motion for moving the neck portion from such a position that the neck portion extends toward a side of the player into such a position that the neck portion extends upward in a vertical direction.

12. The music game system according to claim 7, wherein the predetermined motion of the input device detected by the acceleration device is a rotation of the neck portion such that the neck portion is directed upright.

13. The music game system according to claim 7, wherein the predetermined motion of the input device detected by the acceleration device is a horizontal rotation of the head portion.

14. The music game system according to claim 7, where the predetermined motion of the input device detected by the acceleration device is a motion of the input device along a vertical axis in accordance with a jump of a player.

* * * * *